(12) United States Patent
Hering et al.

(10) Patent No.: US 7,805,486 B2
(45) Date of Patent: Sep. 28, 2010

(54) MEETING EFFECTIVENESS INDICATOR AND METHOD

(75) Inventors: Dean H. Hering, Raleigh, NC (US);
John R. Dixon, Vienna, VA (US);
Robert J. Dougherty, Vienna, VA (US)

(73) Assignee: Netcentrics, Inc., Herndon, VA (US)

( * ) Notice: Subject to any disclaimer, the term of this patent is extended or adjusted under 35 U.S.C. 154(b) by 1306 days.

(21) Appl. No.: 11/138,361

(22) Filed: May 27, 2005

(65) Prior Publication Data

US 2005/0265264 A1 Dec. 1, 2005

Related U.S. Application Data

(60) Provisional application No. 60/575,097, filed on May 28, 2004.

(51) Int. Cl.
*G06F 15/16* (2006.01)
(52) U.S. Cl. ...................................... 709/204
(58) Field of Classification Search ............... 709/204
See application file for complete search history.

(56) References Cited

U.S. PATENT DOCUMENTS

| | | | | | |
|---|---|---|---|---|---|
| 4,023,729 | A | * | 5/1977 | Eaton ........................... | 235/52 |
| 4,377,870 | A | * | 3/1983 | Anderson et al. .............. | 725/24 |
| 5,062,147 | A | * | 10/1991 | Pickett et al. ................. | 714/46 |
| 5,465,370 | A | * | 11/1995 | Ito et al. ...................... | 709/204 |
| 5,586,252 | A | * | 12/1996 | Barnard et al. ................ | 714/48 |
| 5,759,101 | A | * | 6/1998 | Von Kohorn .................. | 463/40 |
| 5,878,214 | A | * | 3/1999 | Gilliam et al. ................ | 709/204 |
| 5,995,951 | A | * | 11/1999 | Ferguson ...................... | 706/10 |
| 6,024,577 | A | * | 2/2000 | Wadahama et al. .......... | 434/322 |
| 6,055,551 | A | * | 4/2000 | Heinlein et al. .............. | 715/210 |
| 6,540,138 | B2 | * | 4/2003 | Hall et al. .................... | 235/386 |
| 6,922,718 | B2 | * | 7/2005 | Chang ......................... | 709/204 |
| 7,007,235 | B1 | * | 2/2006 | Hussein et al. .............. | 715/751 |
| 7,092,001 | B2 | * | 8/2006 | Schulz ..................... | 348/14.05 |
| 7,092,821 | B2 | * | 8/2006 | Mizrahi et al. ................ | 702/1 |
| 7,124,164 | B1 | * | 10/2006 | Chemtob .................... | 709/204 |
| 7,171,448 | B1 | * | 1/2007 | Danielsen et al. ........... | 709/205 |
| 7,177,851 | B2 | * | 2/2007 | Afeyan et al. ................ | 706/13 |

(Continued)

OTHER PUBLICATIONS

E. Page, A. Whatley, Electronic brainstorming, Business Mexico v4n10, Oct 1994 ISSN: 0187-1455.*

(Continued)

*Primary Examiner*—Saleh Najjar
*Assistant Examiner*—Robert Shaw
(74) *Attorney, Agent, or Firm*—Deborah H. Spencer; Moore & Van Allen, PLLC

(57) ABSTRACT

A meeting effectiveness indicator provides information to participants of a meeting. The information includes messages that the meeting has gone off topic, and resources are being wasted. Participants within a room or local vicinity of the indicator used wired or wireless transmitters to send indications that the meeting is going off topic. Remote participants linked to a network also send indications via a network interface. Once a total number of indications reaches a warning threshold, the indicator warns the participants that the meeting is going off topic with a warning message. If additional indications are received, then the total number of indications will reach a tangent threshold, and the participants are alerted using a tangent message that the meeting is off topic.

26 Claims, 4 Drawing Sheets

U.S. PATENT DOCUMENTS

| | | | | |
|---|---|---|---|---|
| 7,310,350 | B1* | 12/2007 | Shao et al. | 370/466 |
| 2001/0035855 | A1* | 11/2001 | Komatsu et al. | 345/156 |
| 2002/0082907 | A1* | 6/2002 | Inomata et al. | 705/12 |
| 2003/0033302 | A1* | 2/2003 | Banerjee et al. | 707/6 |
| 2003/0037157 | A1* | 2/2003 | Pestoni et al. | 709/231 |
| 2003/0043025 | A1* | 3/2003 | Inoue et al. | 340/286.01 |
| 2003/0061092 | A1* | 3/2003 | Dutta et al. | 705/12 |
| 2003/0149681 | A1* | 8/2003 | Frees et al. | 707/1 |
| 2003/0211856 | A1* | 11/2003 | Zilliacus | 455/466 |
| 2003/0233274 | A1* | 12/2003 | Urken et al. | 705/12 |
| 2004/0181577 | A1* | 9/2004 | Skurikhin et al. | 709/204 |
| 2004/0225651 | A1* | 11/2004 | Musgrove et al. | 707/4 |
| 2005/0027800 | A1* | 2/2005 | Erickson et al. | 709/204 |
| 2005/0054286 | A1* | 3/2005 | Kanjilal et al. | 455/3.05 |
| 2006/0095376 | A1* | 5/2006 | Mitchell et al. | 705/50 |

OTHER PUBLICATIONS

Consensor & Comtec ARS History http://www.comtec-ars.com/consensor-history.asp.*

Replysystems—Fleetwood Group ARS (2003) http://web.archive.org/web/20030209063206/http://replysystems.com/.*

Meridia ARS (2003) http://web.archive.org/web/20030331121642/www.meridia-interactive.com/.*

Kraemer & King, Computer-Based Systems for Cooperative Work, ACM Computing Surveys, vol. 20, No. 2, pp. 115-146 (Jun. 1988).*

Nunamaker et al., Electronic Meeting Systems to Support Group Work, Communications of the ACM, vol. 34, Issue 7, Jul. 1991, pp. 40-61.*

Watson et al. Culture, A Fourth Dimension of Group Support Systems, Communications of the ACM, vol. 37, No. 10, Oct. 1994, pp. 44-55.*

Grunbach and Braunsberger, Tool Support to Distributed Requirements Negotiation, In: Cooperative methods and tools for distributed software processes. De Lucia A, Gall H (Eds.), 2003, pp. 56-65.*

* cited by examiner

MEETING EFFECTIVENESS INDICATOR AND METHOD

CROSS REFERENCE TO RELATED APPLICATIONS

This patent application claims priority under 35 USC §119 (e) to the following co-pending patent application: U.S. Provisional Patent Application Ser. No. 60/575,097, filed May 28, 2004, and entitled "Meeting Effectiveness Indicator," the contents of which are hereby incorporated by reference.

BACKGROUND OF THE INVENTION

1. Field of the Invention

The present invention relates to presenting information and messages to a group of individuals in a location or multiple locations. More particularly, the present invention relates to compiling data from users in a group to provide information to the group either in a local area or over a network.

2. Description of Related Art

Every day, corporate, government, private and other entities lose millions of dollars due to unproductive meetings. Meetings tend to get off track and explore side issues without focusing on the original agenda. Questions or explanations regarding a topic may lead to further discussion on topics not related to the meeting. Participants, whether in person or over a network, may be discouraged from interrupting or interjecting to move the meeting back on topic due to reasons such as shyness, confusion or peer pressure.

Further, moderators of meetings may find themselves losing control of a meeting. Strong personalities within the audience may take over and control the meeting which reduces productivity by not achieving the objectives of the meeting. Moderators also may be uncertain if participants are edging towards frustration or boredom from an unproductive meeting.

Systems may gather data from a group of people to provide some sort of status indication. The systems may include monitors or body attachments that gather data or information at the same time from multiple data sources. The monitors may include radio frequency (RF) tags and readers that transmit a signal to a base station with the data of interest. For example, if one desires to know the body temperatures for a group over a period of time, then the people in the group may wear a bracelet that transmits this information on a periodic basis. The monitoring system, however, is cost prohibitive and may not be applicable to meetings or groups, especially those located over long distances. The transmitted signal from the bracelet may become too weak to be of value or reach a base station.

SUMMARY OF THE INVENTION

According to an example of the preferred embodiments, a meeting effectiveness indicator is provided. The meeting effectiveness indicator includes a receiver to receive an indication about a meeting from at least one transmitter. The meeting effectiveness indicator also includes a message logic device to add the indication to a total number of indications and to determine whether the total number of indications correspond to a threshold. The meeting effectiveness indicator also includes a controller to set a threshold within the message logic device. The meeting effectiveness indicator also includes a display to indicate to at least one participant in the meeting that the threshold for the total number of indications is reached.

According to another example of the preferred embodiments, a meeting effectiveness indication system is provided. The meeting effectiveness indication system includes receiving means for receiving an indication about a meeting. The meeting effectiveness indication system also includes adding means for adding the indication to a total number of indications and determining if a threshold for the total number of indications has been reached. The meeting effectiveness system also includes a control means for controlling the threshold within the adding means. The meeting effectiveness indication system also includes display means for displaying that the total number of indications has reached the threshold.

According to another example of the preferred embodiments, a meeting effectiveness indicator is provided. The meeting effectiveness indicator includes a receiver to receive a transmitted indication from a transmitter of a participant in a meeting. The meeting effectiveness indicator also includes a network interface to receive a network indication over a network from a remote participant of the meeting. The meeting effectiveness indicator also includes counting and message logic to determine if a total number of indications, including the transmitted indication and the network indication, corresponds to the at least one of a first threshold and a second threshold. The meeting effectiveness indicator also includes a controller to set the first and second thresholds according to an input. The first and second thresholds are variable. The meeting effectiveness indicator also includes a display to scroll a message regarding the first or second threshold to the participant of the meeting. The network interface sends data to display the message to the remote participant over the network.

According to another example of the preferred embodiments, a method for indicating meeting effectiveness is provided. The method includes receiving an indication about a meeting. The method also includes adding the indication to a total number of indications. The method also includes determining if a threshold for the total number of indications has been reached. The method also includes displaying an alert that the total number of indications has reached the threshold.

BRIEF DESCRIPTION OF THE DRAWINGS

For proper understanding of the preferred embodiments of the present invention, reference should be made to the attached drawings that are included to provide further understanding of the illustrated embodiments, and to explain examples of the present invention.

DETAILED DESCRIPTION OF THE PREFERRED EMBODIMENTS

Reference will now be made in detail to examples of the preferred embodiments of the present invention. Examples of the preferred embodiments are illustrated by the accompanying drawings.

Figure 1:
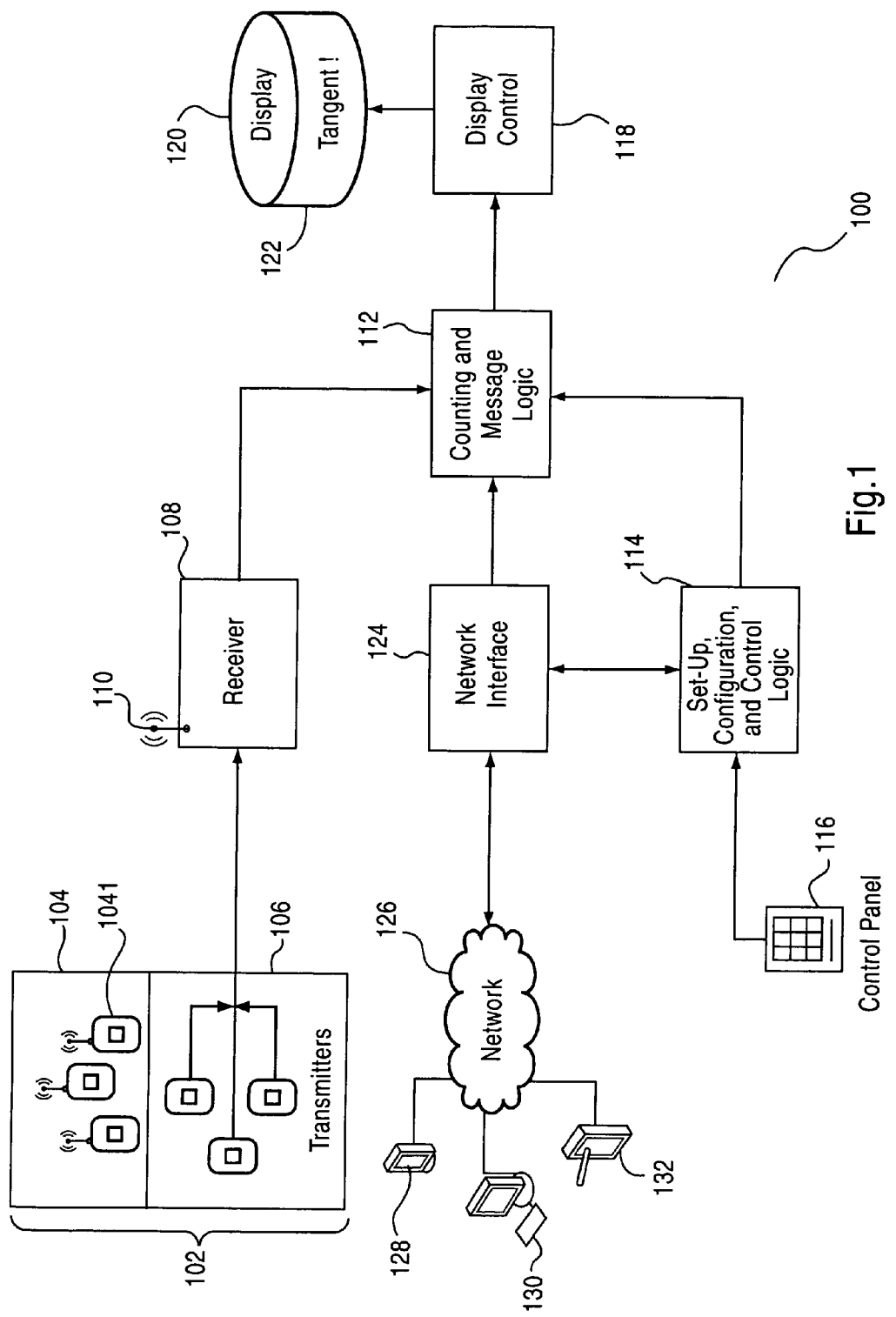
FIG. 1 illustrates a meeting effectiveness indicator for providing meeting effectiveness indication according to the preferred embodiments.

FIG. 1 illustrates a meeting effectiveness indicator 100 for providing meeting effectiveness indication according to the preferred embodiments. Meeting effectiveness indicator 100 may be referred to as a meeting effectiveness indicator may be embodied in a device as an indicator of the status and effectiveness of a meeting. Alternatively, meeting effectiveness indicator 100 may be over a network of linked wired or wireless components. Meeting effectiveness indicator 100 also may be a group of stand alone devices that interact with each other to provide indication of the effectiveness of a meeting.

Meeting effectiveness indicator 100 includes transmitters 102. Transmitters 102 may include wireless transmitters 104 and wired transmitters 106. Alternatively, transmitters 102 may just include wireless transmitters 104 or wired transmitter 106. Transmitters 102 may be any number of transmitters desired for the meeting, and is not limited to the number shown in FIG. 1. Each transmitter of transmitters 102 may be accessed by a user, or participant, of the meeting. Participants also may share transmitters 102.

For example, wireless transmitter 1041 may be used by a participant not sitting at a table within a room holding a meeting. The participant using wireless transmitter 1041 may discreetly indicate tangents without having to get up and use a transmitter on a table. Further, wireless transmitters 104 may transmit signals at different frequencies to avoid signal collisions. Alternatively, transmitters 104 may transmit signals at the same frequency, with or without collision avoidance algorithms.

Transmitters 102 may include switches that transmit signals having a tangent indication to receiver 108. The switches may be pushbutton activated and pressed by a participant to transmit the signal. The switches also may include options, such as cancel, to delete a tangent indication if the meeting gets back on track. Wired transmitters 106 may be placed in a close proximity to receiver 108, and coupled by wires running underneath a table. The location of wired transmitters 106 also may be under the table to provide users privacy in transmitting a tangent indication signal.

Receiver 108 may receive signals from transmitters 102 and process the signals into data. For example, receiver 108 may be a transceiver that includes an antenna 110. Receiver 108 also may include a converter to change analog signals to digital signals. Other functions of receiver 108 may include filtering signals and separating signals from different transmitters.

Receiver 108 may receive signals from transmitters 102 at different frequencies from wireless transmitters 104. Signals from wired transmitters 106 may not be converted as these signals may already be in a digital format. Receiver 108 also may output the number of signals received from transmitters 102. Receiver 108 may provide the output regarding received signals on a periodic basis. Alternatively, receiver 108 may provide output on received signals continuously so that meeting effectiveness indicator 100 may determine when a level of received signals has been reached.

Receiver 108 also may broadcast a signal to synchronize transmitters 102. The synchronization may occur prior to the start of a meeting, thus enabling the transmitters 102 to begin sending signals to receiver 108. Further, receiver 108 may clear itself so that data from a previous meeting is deleted. Receiver 108 may transmit a synchronization signal at any time, even during the meeting, such as after a reset. Alternatively, transmitters 102 may wait for a pulse from receiver 108. Receiver 108 may transmit these signals on a different frequency than transmitters 102.

Counting and message logic 112 may receive the output data regarding received signals from receiver 108. Message logic 112 may be circuitry that acts as a counter to indicate the number of signals received by meeting effectiveness indicator 100. Message logic 112 also may provide a warning threshold and a tangent threshold. The warning threshold may correspond to the number of received signals that result in a "warning" indication being sent by meeting effectiveness indicator 100. A warning indication may be used to let participants or a moderator of the meeting know that the discussion is going off topic. The tangent threshold may correspond to the number of received signals that result in a "tangent" indication being communicated by meeting effectiveness indicator 100. A tangent indication may be used to let participants or a moderator of a meeting know that the discussion is now off topic, and time and resources are being wasted.

The warning and tangent thresholds may be provided to message logic 112 by set-up, configuration, and control logic 114, hereinafter control logic 114. Control logic 114 also may include circuitry or a processor that provides instructions or information to message logic 112. Control logic 114 may receive input from control panel 116.

For example, a user, such as the moderator, of meeting effectiveness indicator 100 may input the number of signals desired for the warning and tangent thresholds. Control logic 114 may store these thresholds until meeting effectiveness indicator 100 is activated for the meeting. Control logic 114 forwards the thresholds to message logic 112. When one of the thresholds is met by receiving enough tangent signals from transmitters 102, message logic 112 may indicate the appropriate warning or tangent message to be given. Message logic 112 may output data to display control 118 that a threshold has been breached, and that meeting effectiveness indicator 100 should indicate this event to the meeting.

Control logic 114 may allow adjustment to the thresholds during the meeting, such as when participants join in or leave. Control logic 114 also may store default warning and tangent thresholds that are used absent any data from control panel 116. For example, control logic 114 may detect the number of transmitters 102 and determine the appropriate thresholds according to the number. Alternatively, message logic 112 may perform this function. Control logic 114 also may provide data regarding the transmission frequencies of transmitters 102, the receiving frequencies of receiver 108 and the like.

Further, control logic 114 may provide the time period for detecting received signals if system is configured to account for signals on periodic basis. The time period also may be adjustable. For example, control panel 116 may be set to send data that meeting effectiveness indicator 100 is to check for received signals every 10 seconds. Thus, message logic 112 may check with receiver 108 to see how many received signals have been processed every 10 seconds. Once the number exceeds the warning or tangent threshold, message logic 112 forwards data to display control 118 to indicate the threshold breach. Alternatively, message logic 112 may react to the number of received signals processed by receiver 108 within the specified time period, instead of accumulated received signals.

Display control 118 may control display 120. Display 120 may display message 122. Message 122 may correspond to the threshold that was breached within message logic 112. For example, if the tangent threshold was breached, then message 122 would display a "tangent" message. Display control 118 may control the types of messages that are displayed as well as the frequency of display. As time goes by with any information from meeting effectiveness indicator

100, display control 118 may output message 122 more frequently to get the attention of the moderator or participants of the meeting. Display control 118 also may add or remove different messages that are shown on display 120.

Meeting effectiveness indicator 100 may not be limited to receiving data or input from transmitters 102. Meeting effectiveness indicator 100 also may include network interface 124 that exchanges data with network 126. Network 126 may be coupled to devices 128, 130 and 132. For example, device 128 may be a mobile phone, device 130 may be a computer, and device 132 may be a personal digital assistant. Devices 128, 130 and 132 also may be laptops, networked pushbutton devices, or input from indicators being used in a remote location. For example, another set of transmitters may be used to collect warning or tangent data, and then forwarded to meeting effectiveness indicator 100. Additional devices also may be coupled or interact with network 126.

Devices 128, 130 and 132 may act like transmitters 102 by sending signals or data via network 126 to meeting effectiveness indicator 100 that the meeting is veering off topic. Network interface 124 may receive the data and forward any data regarding off topic indications to message logic 112. Message logic 112 may add the received data from network 126 to the number of tangent signals received from transmitters 102 to determine if the warning threshold or tangent threshold has been breached.

Network 126 may be any network that exchanges data. For example, network 126 may be a wide area network, local area network, the internet, a wireless network, a virtual network and the like. Participants may be remotely located away from the physical location of the meeting and meeting effectiveness indicator 100 but still are able to indicate when a meeting is getting off track using network 126.

Devices 128, 130 and 132 may interface with network 126 in a conventional manner, or may download files or software that allows devices 128, 130 and 132 to interact with network interface 124. Alternatively, a web interface may be provided by network 126 that relays data to network interface 124. For example, a participant may click a button within a browser, webpage or other graphical user interface to indicate a meeting is off track, with this data is forwarded to network interface 124.

Devices 128, 130 or 132 also may include an interface to interact with network interface 124 of meeting effectiveness indicator 100. The interface may be implemented as hardware or software. Any security measures, compression or other processing of the tangent signal also may be implemented.

Network interface 124 also may provide a web-based interface to program thresholds, messages, staff rates, agenda items, and other information. For example, if the moderator of the meeting is using device 130, then the moderator may set the parameters for the meeting, and meeting effectiveness indicator 100, via network 126 and network interface 124. Network interface 124 also may allow indicators, transmitters and the like in remote locations to be networked with meeting effectiveness indicator 100 so participants attending the meeting via telephone or network 126 may be synchronized to indicate tangents and send/receive messages.

Message logic 112, in conjunction with network interface 124 or receiver 108, may allow additional text or audio messaging and cueing. Text messages may be displayed on display 120 in addition to warnings. Further, message logic 112 may authorize sounds or audio reminders to be triggered. Because participants over network 126, in some instances, may not be able to view display 120, message logic 112 may forward instructions to devices 128, 130 and 132 to indicate the meeting is off track because a warning or tangent threshold level has been breached.

Thus, if a participant in a meeting supported by meeting effectiveness indicator 100 believes the topic is getting off track, or tangent, the participant may press a button or otherwise indicate their belief to meeting effectiveness indicator 100. After enough participants indicate the meeting is off topic, a warning threshold may be reached that is displayed on display 120 or on devices 128, 130 or 132 that the meeting should get back on track. If additional tangent indications are received, the tangent threshold is reached. Participants are warned that the meeting may be seriously off topic, and resources and time are being wasted. Thus, the moderator or participants may stop the meeting or get back on topic to prevent additional wastes of time or resources.

For example, six people may meet to discuss various agenda items. Meeting effectiveness indicator 100 may set control logic 114 to display a "warning" message if one person sends a tangent indication signal from transmitters 102 or over network 126. Control panel 116 may be used to input these parameters. Control logic 114 also may be instructed to display a "tangent" message if three people send tangent indications. Thus, message logic 112 may be instructed to set the warning threshold to one (1) and the tangent threshold to three (3).

In addition, control logic 114 may instruct display control 118 and message logic 112 to display the cost of the meeting every ten minutes on display 120. Further, a cash register sound, such as "cha-ching," may sound as the cost message is put on display 120. The current agenda item also may displayed at the time is it scheduled to begin and every 15 minutes thereafter.

According to the example, the meeting follows its normal flow. No tangent indications or signals are received by meeting effectiveness indicator 100. After several minutes, the discussion begins to go off topic. A participant presses a button on one of the transmitters 102. Receiver 108 receives the signal and passes the tangent indication onto message logic 112. Message logic 112 determines the warning threshold has been reached, and instructs display control 118 to display the warning message on display 120. The moderator sees the warning message and gets the meeting back on topic.

The meeting returns to its normal flow. After several additional minutes, the discussion again gets off topic. A participant presses a button on one of transmitters 102, and display 120 shows a warning message, as discussed above. The discussion continues to stay off topic. Two additional participants send tangent indications from their transmitters 102 within 15 seconds of the first tangent indication. Message logic 112 determines that the tangent threshold has been reached and instructs display control 118 to display a tangent message on display 120. Moderator notices the tangent message and gets the discussion and the meeting back on topic.

The meeting continues for several more minutes according to the example. The agenda changes to the next item, and display 120 scrolls a message indicating the change. The moderator sums up the current agenda and proceeds to discuss the new one.

Within the first couple minutes discussing the new agenda item, the discussion gets off topic. All participants are involved in this discussion and no one presses a transmitter or sends a tangent indication signal. Meeting effectiveness indicator 100 calculates the total cost of the meeting up to that point and display 120 shows the cost in a message at the appropriate interval, along with the "cha-ching" sound cue.

The moderator recognizes the message, and brings the discussion back to the agenda item.

After several additional minutes, a participant accidentally presses a button on a transmitter to send a tangent indication signal to receiver 108. Realizing the error, the participant presses a cancel button and the warning message is prevented from being displayed on display 120. Finally, the meeting is concluded and meeting effectiveness indicator 100 is turned off.

Figure 2A:
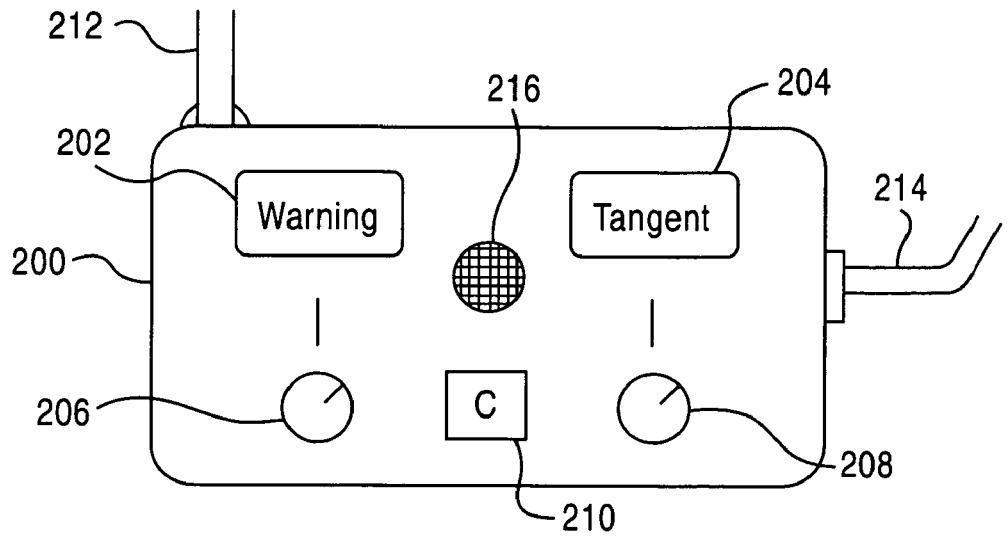
FIG. 2A illustrates a display unit having indicators according to the preferred embodiments.
Figure 2B:
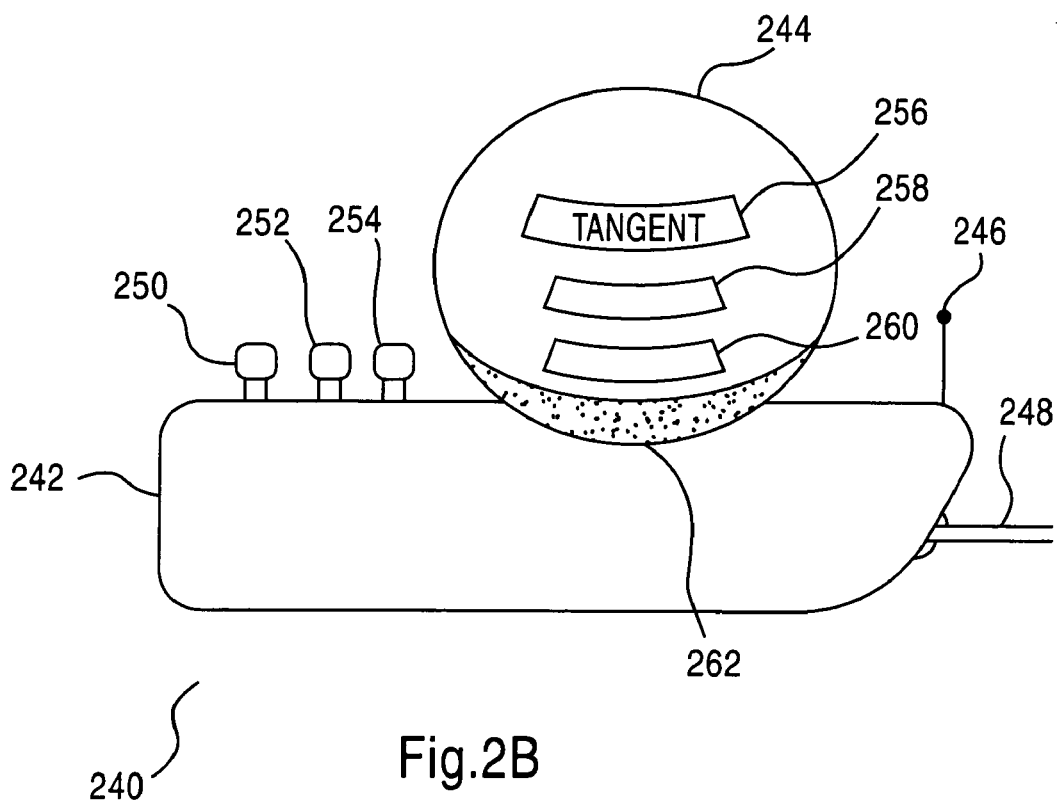
FIG. 2B illustrates a monitor displaying messages and information regarding meeting effectiveness according to the preferred embodiments.
Figure 2C:
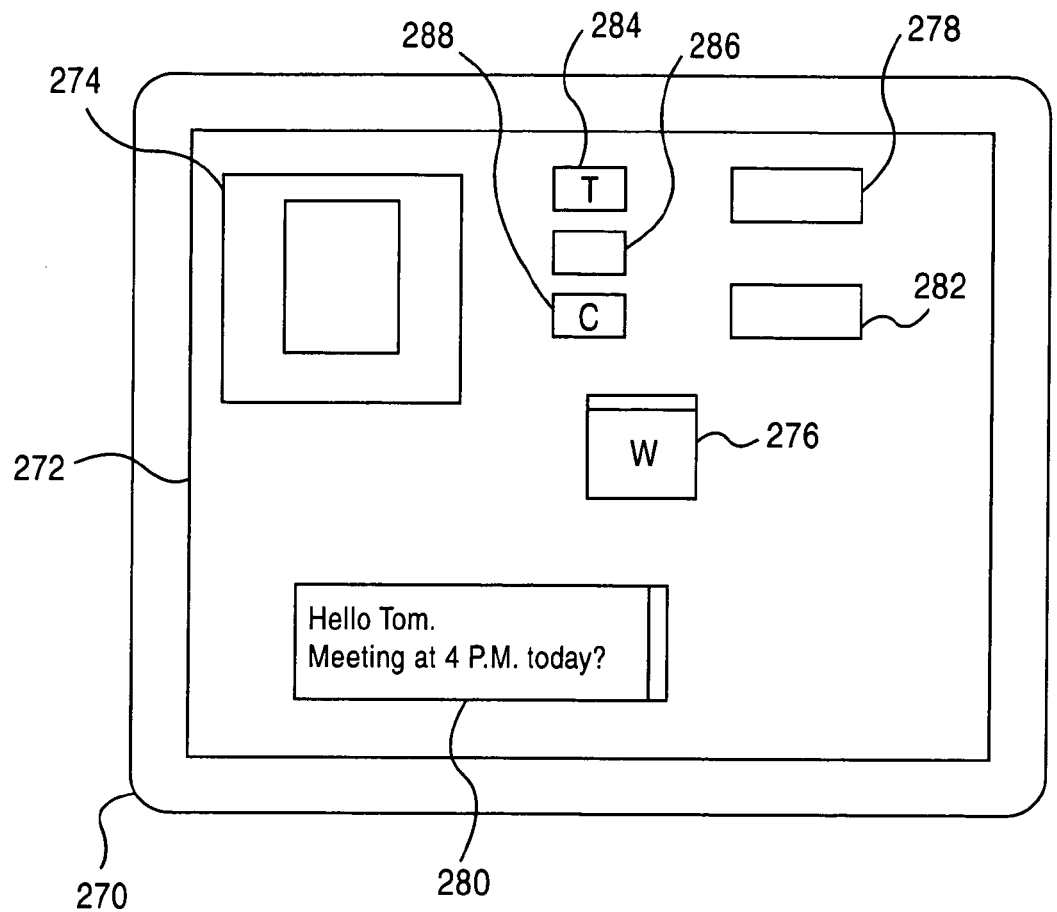
FIG. 2C illustrates a display for meeting effectiveness indication according to the preferred embodiments.

FIGS. 2A-2C depict examples of different displays that may be used to indicate to participants that a certain number believe the meeting is off topic. FIG. 2A depicts display 200 having indicators 202 and 204 according to the preferred embodiments. Display 200 may be mounted on additional components of a meeting effectiveness indicator, such as meeting effectiveness indicator 100 in FIG. 100. Alternatively, display 200 may be stand-alone, such as on top of a table.

Display 200 includes indicators 202 and 204. Indicator 202 may be a "warning" indicator that is activated when the warning threshold, as discussed above, is reached. Indicator 202 may be a light emitting diode (LED) that comes on to indicate visually that the meeting is starting to go off track because enough tangent indications have been received from participants via their transmitters or the network. Indicator 202 may blink or flash on and off periodically to get the participants' attention. Indicator 202 also may be any other light source or visual cue and is not limited to LEDs.

Indicator 204 may a "tangent" indicator that is activated when the tangent threshold, also discussed above, is reached. Indicator 204 also may be a LED that activates to indicate visually that the meeting is has gone off track because enough tangent indications have been received from participants via the transmitters or the network. Indicator 204 also may blink or flash on and off periodically. As with indicator 202, indicator 204 also may be any other light source or visual cue. Indicators 202 and 204, however, may emit different colors to distinguish themselves to the participants.

For example, indicator 202 may include an amber or a yellow light to indicate the warning threshold has been reached. Indicator 204 may include a red light to indicate the tangent threshold has been reached. Other colors and combinations also may be used with indictors 202 and 204. Further, once indicator 204 is activated, indicator 202 may go back to an off state.

Display 200 also includes selectors 206 and 208. Selector 206 may correspond to warning indicator 202 and is used to select the warning threshold for the meeting. Numbers maybe marked on display 200 to facilitate the selection of the threshold. Selector 208 may correspond to tangent indicator 204 and is used to select to select the tangent threshold. The threshold levels available to selector 208 may be greater than those for selector 204. Display 200 also includes cancel button 210. Cancel button 210 may be pressed to turn off indicator 202 or indicator 204. Further, cancel button 210 may be pressed to cancel the meeting effectiveness operations altogether.

Display 200 may be coupled to a switch or plurality of switches via coupler 212. Coupler 212 may be a cable that physically couples with the transmitters such as wired transmitters 106 in FIG. 1. Alternatively, display 200 may be coupled to other components via coupler 212. Power cord 214 may provide power to display 200. Display 200 also may include an audio speaker 216. Audio speaker 216 may provide audio cues in addition to the visual cues provided by indicators 202 and 204.

FIG. 2B depicts a display unit 240 for meeting effectiveness indication according to the preferred embodiments. Display unit 240 may provide more information to meeting participants than display 200 shown in FIG. 2A. Display unit 240 may scroll messages across display 244 to participants once the warning threshold or tangent threshold has been reached.

Display unit 240 includes base 242. Base 242 may house various components or the power source for display unit 240. Base 242 supports display base 262 that holds display 244. Base 242 also supports cancel message knob 250, tangent threshold knob 252 and warning threshold knob 254. Thresholds, messages and other parameters may be set using knobs 250, 252 and 254.

Display 244 scrolls various messages of information. Display 244 may have a globe configuration to scroll the messages around the room holding a meeting. Thus, participants within the room or local vicinity may be able to view the messages. Instead of lights, display 244 may scroll text messages or other information. For example, message 256 may be the largest message and includes text such as "warning" or "tangent" to alert meeting participants that the thresholds have been reached. Messages 258 and 260 may include other information of interest, such as time spent over the warning or tangent thresholds. Other messages may include time spent at the meeting, current topic of discussion, number of participants, and the like. In other words, messages 256, 258 and 260 may include information that is not related to warning or tangent thresholds that is of value to participants.

The current costs associated with exceeding the warning threshold or tangent threshold also may be displayed within a message. For example, message 260 may include a running calculation of the cost of the meeting that is updated periodically as time passes. For example, message 260 may be displayed every 10 minutes. The cost may be calculated by using a billing rate associated with each participant. This additional information may provide more focus to the problem of wasteful meetings.

Display device 240 also may include antenna 246 to receive signals from wireless transmitters, or a base station that provides indications when a threshold has been reached. Display device 240 also may be coupled to other devices, components, or a power source via coupler 248. Coupler 248 may be a coaxial or fiber-optic cable, a power cord, and the like. Thus, display device 240 may provide more information and feedback that display 200, as well as more flexibility in providing information.

FIG. 2C depicts a monitor 270 displaying messages and information regarding meeting effectiveness according to the preferred embodiments. Monitor 270 may be coupled or mounted on a computer or enclosed in a mobile device. For example, monitor 270 may be attached to a laptop computer that is accessing the meeting over a network. Monitor 270 may show display window 272 that is viewed by the participant.

Display window 272 may include icons, windows, text messages and other interface functionalities. For example, display window 272 may include videoconference window 274 that shows streaming video of the meeting in progress. Videoconference window 274 may include video of the speaker, the meeting room, a table, the display device for meeting effectiveness indication, and the like. Audio and video data may be delivered over a network, such as the internet.

Display window 272 also may include various graphical user interfaces that send or display data from the network pertaining to the meeting. For example, window 276 may be displayed to the participant when a warning or tangent threshold is reached. Once enough tangent indications have been received for the meeting, remote users may be alerted that the warning threshold or tangent threshold has been reached. Window 276 may pop up and flash within display window 272 that the meeting is in a warning or tangent state. The participant viewing display window 272 may click window 276 to acknowledge the warning.

Display window 272 also may include text message window 280 that allows the participant to send text messages to participants attending the meeting at other locations. Further, text message window 280 may scroll information or data pertaining to the current speaker. Message windows 278 and 282 may display information or data pertaining to the meeting, such as time spent in the meeting, current costs of the meeting, and the like. Additional windows may be spawned for other purposes or messages concerning the meeting.

Buttons 284, 286 and 288 may allow the participant viewing display window 272 to communicate over the network to the meeting. For example, button 284 may send a tangent indication to the meeting effectiveness indicator that the participant believes the meeting is going off topic. This act may be analogous to pressing the button on a transmitter by someone physically at the meeting. Button 288 may cancel the tangent indication from the participant. Button 286 may be used to send additional information to the meeting effectiveness indicator, or to allow the participant viewing display window 272 to chime into the meeting to talk over the network.

Figure 3:
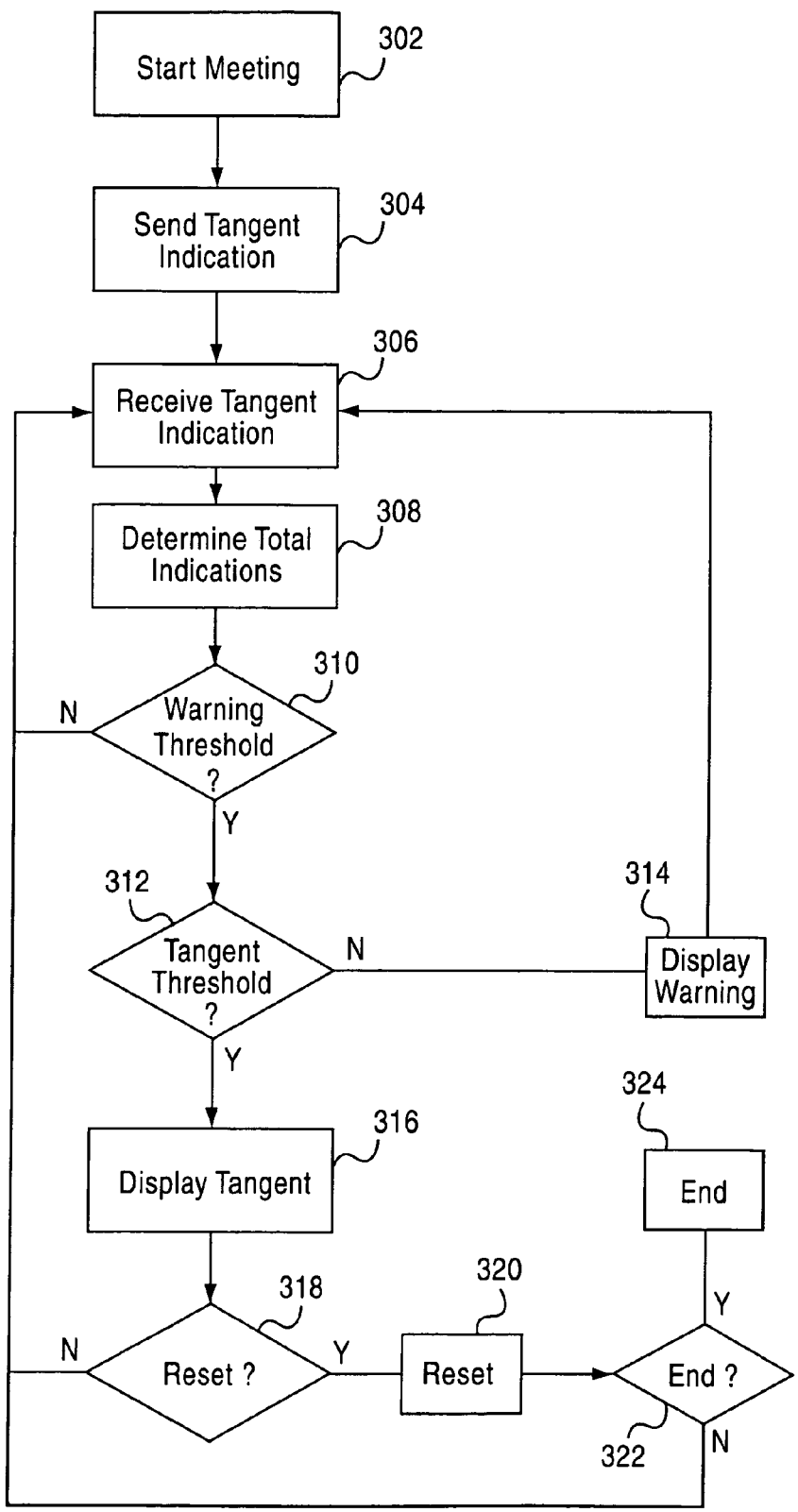
FIG. 3 illustrates a flowchart for indicating meeting effectiveness according to the preferred embodiments.

FIG. 3 depicts a flowchart for indicating meeting effectiveness according to the preferred embodiments. Step 302 executes by starting the meeting and activating the meeting effectiveness indicator. For example, referring back to FIG. 1, meeting effectiveness indicator 100 may be activated to collect information and indicate when the meeting is going off topic. Step 304 executes by sending tangent indications to the meeting effectiveness indicator. The indications may be signals from remote transmitters or wired transmitters that are pressed to send the tangent indication. Further, as discussed above, tangent indications may be sent over a network from remote participants.

Step 306 executes by receiving the tangent indications at the meeting effectiveness indicator. Referring back to FIG. 1, receiver 108 may receive indications from transmitters 102 while network interface 124 receives indications over network 126. Additional processing or detecting may occur in this step to verify that a valid indication has been received. Step 308 executes by determining the total tangent indications received during the meeting. For example, the meeting effectiveness indicator may compile the number of tangent indications to keep a running total for the meeting. Alternatively, older tangent indications may be deleted after a certain period of time, or a change in an agenda item. Referring back to FIG. 1, message logic 112 may compile the number of tangent indications received.

Step 310 executes by determining whether the warning threshold has been reached by the number of tangent indications. The warning threshold may be preset prior to the meeting, or may be a default value. If the number of tangent indications equal or exceed the warning threshold, then the participants may be alerted to this state to put the meeting back on track. Thus, if step 310 is no, then the flowchart returns back to step 304 to receive another tangent indication.

If step 310 is yes, then step 312 executes by determining whether the tangent threshold has been reached. The tangent threshold may be greater than the warning threshold, and also may be preset prior to the start of the meeting or a default setting. If the number of tangent indications equal or exceed the tangent threshold, then the participants may be alerted that the meeting is now off topic and resources are being wasted. Thus, if step 312 is no, then step 314 executes by displaying a warning message, or alert, to the participants. The warning message is displayed because the warning threshold was reached, but the tangent threshold was not.

If step 312 is yes, then step 316 executes by displaying a tangent message, or alert, to the participants. The tangent message may be more urgent than the warning message, and may indicate that the meeting already has gone off topic. Step 316 may continue to be executed until made to stop. Step 318 executes by determining whether the meeting effectiveness indicator has been reset. The meeting effectiveness indicator may be reset when the meeting is back on topic or a new agenda item is being discussed. If step 318 is no, then the flowchart returns control to step 306 to keep receiving tangent indications. Tangent indications may not be blocked from reception just because a tangent or warning state is in effect.

If step 318 is yes, then step 320 is executed to reset the meeting effectiveness indication process. Step 322 executes by determining whether the meeting effectiveness indicator is to end operations. For example, the meeting may be over, and the indicator is to be turned off or set to quit receiving signals. If step 322 is no, then the flowchart returns control to step 306 to keep receiving tangent indications. If step 322 is yes, then step 324 executes by ending the process.

Thus, a meeting effectiveness indicator and applicable method are provided that may be used to keep a meeting on track, and to reduce wasteful diversions during the meeting. For example, the meeting effectiveness indicator may sit on a table in a room in a position to be seen by all the participants of the meeting. Participants may use wired and wireless transmitters to indicate that they believe a discussion is going off topic. The number of indications is compiled until a warning threshold is reached. If the indications keep being received, then a tangent threshold is reached. A display message or other cue may be given to alert participants that resources and time are being wasted.

The preceding discussion has presented various embodiments for indicating the effectiveness of a meeting. As one of average skill in the art will appreciate, other embodiments may be derived from the teachings of the present invention as encompassed by the following claims without deviating from the scope of the claims and their equivalents.

The invention claimed is:

1. A meeting effectiveness indicator comprising:
   a receiver to receive an indication from at least one transmitter that a meeting is going off topic, wherein the at least one transmitter is wired or wireless and wherein the indication is part of a binary indication system with options to send an indication that the meeting is going off topic or not to send an indication that the meeting is going off topic;
   a message logic device to add the indication to a total number of indications and to determine whether the total number of indications correspond to a threshold;
   a controller to set the threshold within the message logic device; and
   a display to indicate to at least one participant in the meeting that the threshold for the total number of indications is reached, thereby providing a real-time status update that the meeting is going off topic.

2. The meeting effectiveness indicator of claim 1, further comprising a control panel to input the threshold to the controller.

3. The meeting effectiveness indicator of claim 1, wherein the controller sets an other threshold within the message logic device, and wherein the other threshold is greater than the threshold.

4. The meeting effectiveness indicator of claim 1, wherein the display includes a visual indicator to indicate that the threshold is reached.

5. The meeting effectiveness indicator of claim 1, further comprising an audio device to indicate audibly that the threshold is reached.

6. The meeting effectiveness indicator of claim 1, further comprising a cancellation means for preventing the display from indicating that the threshold is reached.

7. The meeting effectiveness indicator of claim 1, further comprising a network interface to receive an indication that the meeting is going off topic sent over a network.

8. The meeting effectiveness indicator of claim 7, wherein the network interface is coupled to the message logic device to provide the network indication to the total number of indications.

9. A meeting effectiveness indication system comprising:
an indication that a meeting is going off topic, wherein the indication is part of a binary indication system with options to send an indication that the meeting is going off topic or not to send an indication that the meeting is going off topic;
at least one transmitter to transmit the indication that the meeting is going off topic, wherein the at least one transmitter is wired or wireless;
a receiver for receiving, from the at least one transmitter, the indication that the meeting is going off topic;
circuitry to indicate a total number of indications and to determine if a threshold for the total number of indications has been reached;
a controller to set the threshold within the circuitry; and
a display to provide an alert that the total number of indications has reached the threshold, thereby providing a real-time status update that the meeting is going off topic.

10. The meeting effectiveness indication system of claim 9, wherein the receiver includes a network interface.

11. The meeting effectiveness indication system of claim 10, wherein the network interface receives the indication over a network.

12. The meeting effectiveness indication system of claim 11, wherein the network is coupled to a device of a participant of the meeting over the network.

13. The meeting effectiveness indication system of claim 9, wherein the display means includes a visual display.

14. The meeting effectiveness indication system of claim 13, wherein the visual display scrolls a message across the visual display, and wherein the message corresponds to the threshold.

15. The meeting effectiveness indication system of claim 9, wherein the threshold comprises a warning threshold and a tangent threshold, wherein the tangent threshold is higher than the warning threshold.

16. A method for indicating meeting effectiveness, the method comprising:
transmitting, by at least one transmitter, an indication that a meeting is going off topic, wherein the at least one transmitter is wired or wireless and wherein the indication is part of a binary indication system with options to send an indication that the meeting is going off topic or not to send an indication that the meeting is going off topic;
receiving, by a receiver, the indication from the at least one transmitter that the meeting is going off topic;
adding, using circuitry, the indication to a total number of indications;
determining, using circuitry, if a threshold for the total number of indications has been reached;
setting the threshold within the circuitry by using a controller; and
using a display to provide an alert that the total number of indications has reached the threshold, thereby providing a real-time status update that the meeting is going off topic.

17. The method of claim 16, wherein the using a display step comprises displaying the alert, wherein the alert includes a message.

18. The method of claim 16, wherein the using a display step comprises activating a visual indicator.

19. The method of claim 16, wherein the using a display step comprises displaying a graphic within a display window.

20. The method of claim 16, further comprising canceling the indication.

21. The method of claim 16, further comprising resetting the total number of indications to cancel the displaying using a display step.

22. The method of claim 16, further comprising receiving the indication from a device over a network.

23. A meeting effectiveness indicator comprising:
a receiver to receive an indication from a transmitter of a participant of a meeting that a meeting is going off wherein the at least one transmitter is wired or wireless and wherein the indication is part of a binary indication system with options to send an indication that the meeting is going off topic or not to send an indication that the meeting is going off topic;
a network interface to receive a network indication over a network from a remote participant of the meeting that the meeting is going off topic, wherein the network indication is part of a binary system with options to send an indication that the meeting is going off topic or not to send an indication that the meeting is going off topic;
counting and message logic to determine if a total number of indications, including the transmitted indication and the network indication corresponds to at least one of a first threshold and a second threshold;
a controller to set the first and second thresholds according to an input, wherein the first and second thresholds are variable;
a display to scroll a message regarding the first or second threshold to the participant of the meeting; wherein the network interface sends data to display the message to the remote participant over the network, thereby providing a real-time status update that the meeting is going off topic.

24. The indicator of claim 23, wherein the first threshold is less than the second threshold.

25. The indicator of claim 23, wherein the first threshold comprises a warning threshold.

26. The indicator of claim 23, wherein the second threshold comprises a tangent threshold.

* * * * *